United States Patent
Mangelsen

(10) Patent No.: US 7,416,400 B1
(45) Date of Patent: *Aug. 26, 2008

(54) REINFORCED METAL CLAY EXTRUDER

(75) Inventor: William P. Mangelsen, Kowloon (HK)

(73) Assignee: Sino Harvest Limited, Kwun Tong, Kowloon (HK)

( * ) Notice: Subject to any disclaimer, the term of this patent is extended or adjusted under 35 U.S.C. 154(b) by 124 days.

This patent is subject to a terminal disclaimer.

(21) Appl. No.: 11/483,213

(22) Filed: Jul. 7, 2006

Related U.S. Application Data

(63) Continuation-in-part of application No. 11/144,555, filed on Jun. 3, 2005.

(51) Int. Cl.
*B29C 47/00* (2006.01)

(52) U.S. Cl. .................... 425/376.1; 425/461; 222/390; 222/391

(58) Field of Classification Search ............. 425/376.1, 425/461; 222/390, 391
See application file for complete search history.

(56) References Cited

U.S. PATENT DOCUMENTS

| | | | |
|---|---|---|---|
| 1,318,928 A * | 10/1919 | Shields | 222/327 |
| 2,420,616 A * | 5/1947 | Palmer | 425/72.1 |
| 2,955,530 A * | 10/1960 | Nilo | 100/289 |
| 3,984,033 A * | 10/1976 | Groth et al. | 222/333 |
| 4,456,450 A * | 6/1984 | Heling | 425/376.1 |
| 5,183,671 A * | 2/1993 | Perez | 425/190 |
| 6,439,274 B1 * | 8/2002 | DeBoisblanc | 141/67 |

* cited by examiner

*Primary Examiner*—Yogendra Gupta
*Assistant Examiner*—Maria Veronica D Ewald
(74) *Attorney, Agent, or Firm*—G. Brian Pingel; Camille L. Urban

(57) ABSTRACT

The present invention provides a clay extruder having a reinforced plunger for shaping clay into desired patterns. The extruder has a screw disposed within a sleeve, a reinforced plunger located on the screw and inside the sleeve, a handle located on the screw and outside of the sleeve, and a perforated disk opposite the insertion of the screw into the sleeve. The handle is used to turn the screw and move the plunger through the sleeve. As the plunger pushes clay out the sleeve, an o-ring around the plunger prevents clay from leaking back, and a perforated disk molds the clay into a desired pattern. Metal construction and a thicker side of the plunger allow the extruder to be subjected to high amounts of torque and pressure without damage or failure.

17 Claims, 5 Drawing Sheets

REINFORCED METAL CLAY EXTRUDER

This is a Continuation-In-Part of application Ser. No. 11/144,555 filed Jun. 3, 2005.

BACKGROUND OF THE INVENTION

1. Field of the Invention

The present invention relates to clay shaping tools, and more particularly, to clay extruders.

2. Description of Related Art

To aid in the shaping of clay, artisans have long used clay extruders. Simple clay extruders consist of a plunger that is pushed through a hollow structure by application of pressure on a handle connected to the plunger. By use of holes with different designs at the ends of extruders, clay can be extruded into different shapes. Hand held extruders are basically syringes for clay. Plastic syringe type clay extruders require great force to extrude clay and are subject to failure from the stress required to push clay through an open end. Metal syringe type extruders are more rigid than plastic extruders and are able to accommodate more force than plastic extruder. However, metal extruders are also difficult to operate. Both metal and plastic extruders are prone to leaking back of clay past the plunger. Because of the force that must be exerted on the plunger to extrude clay, the plunger is also prone to failure.

It is therefore desirable to have an extruder that prevents leaking back of clay. It is also desirable to have an extruder that needs less force to operate. It is further desirable to have an extruder with a reinforced plunger that can accommodate a high amount of torque.

SUMMARY

The present invention is an apparatus for extruding clay. A screw jack disposed within a sleeve is manually turned to push a plunger into the sleeve. As the plunger pushes into the sleeve, any clay in the sleeve is forced out an open end. The open end has a disc perforated with a desired design. Different designs in the perforated disc result in different shapes of clay that is extruded through the disc. The handle on the screw resembles a "T" allowing for easy application of force to turn the screw. The plunger is thicker on the face that is not exposed to the clay to reinforce the plunger and prevent failure. An O-ring between the plunger and the sleeve prevents leaking back of clay.

By making the apparatus out of metal, the apparatus is able to withstand greater torque on the screw and higher pressure on the sleeve. Texturing the sleeve aids in gripping of the sleeve and further increases the amount of force that may be applied to the handle.

An advantage of the present invention over previous extruders is that less force needs to be applied to rotate a screw jack than to directly push a plunger.

Another advantage of the present invention is the reinforced plunger to prevent the plunger from failing.

A further advantage of the present invention is the prevention of leak back of clay.

An additional advantage of the present invention is metal construction which withstands high torque and pressure.

Yet another advantage of the present invention is texturing on the sleeve to provide a better grip of the extruder.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
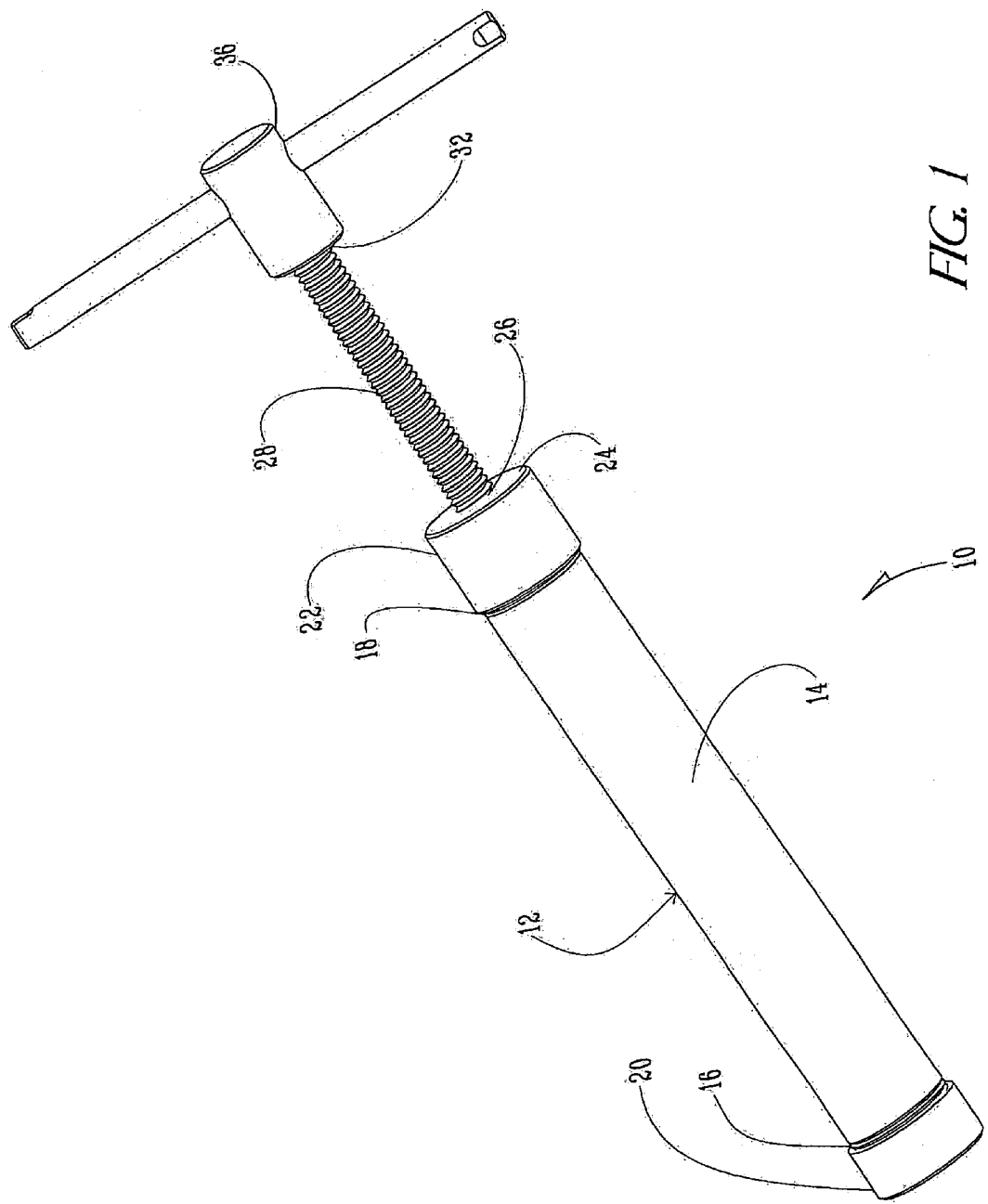
FIG. 1 is a perspective view of the preferred embodiment of the clay extruder of the present invention.

The present invention of a clay extruder 10 is shown in FIG. 1. The extruder 10 has a hollow sleeve 12 with a body portion 14, a first end 16, and a second end 18. An extrusion cap 20 serves as an extrusion means and is associated with the sleeve first end 16. A screw cap 22 is associated with the sleeve second end 18. A top 24 on the screw cap 22 has an aperture 26 to receive a screw 28. In the preferred embodiment the screw 28 is externally threaded and the screw cap 22 is internally threaded at the aperture 26 so that the screw 28 and the screw cap 22 engage each other. Rotation of the screw 28 pushes the screw 28 further into or out of the sleeve 12. Clay, not shown, in the sleeve 12 is pushed out of the sleeve 12 as the screw 28 is rotated and pushed into the sleeve 12.

Figure 2:
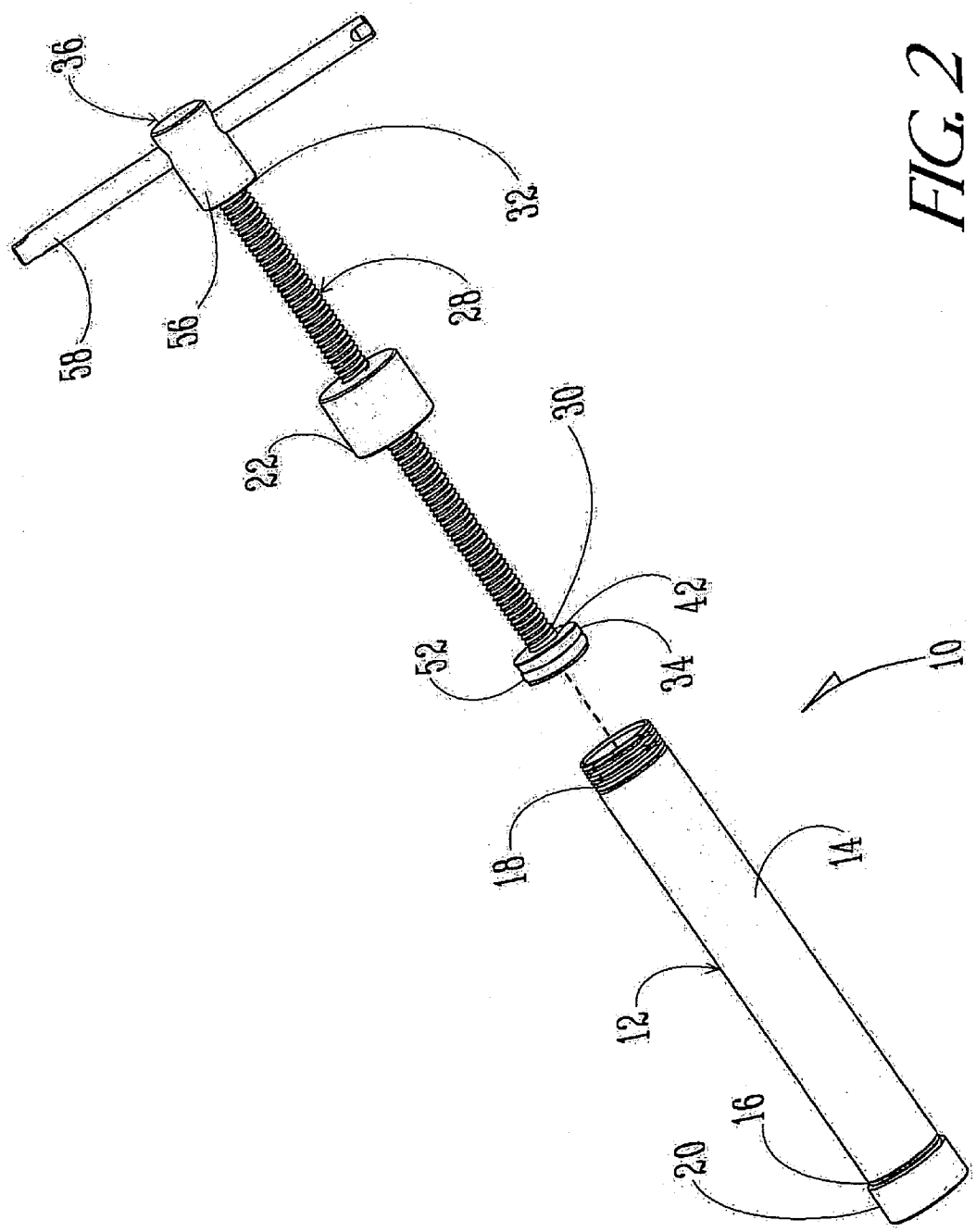
FIG. 2 is a perspective view of the extruder of FIG. 1 showing the screw removed from the sleeve.

As shown in FIG. 2, the screw 28 has a first end 30 and a second end 32. A reinforced plunger 34 is associated with the screw first end 30 and a handle 36 is associated with the screw second end 32. The handle 36 allows manual rotation of the screw 28. As the screw 28 moves into the sleeve 12, the plunger 34 engages any clay in the sleeve 12 and pushes the clay therefrom to pass though the extrusion cap 20.

Figure 3:
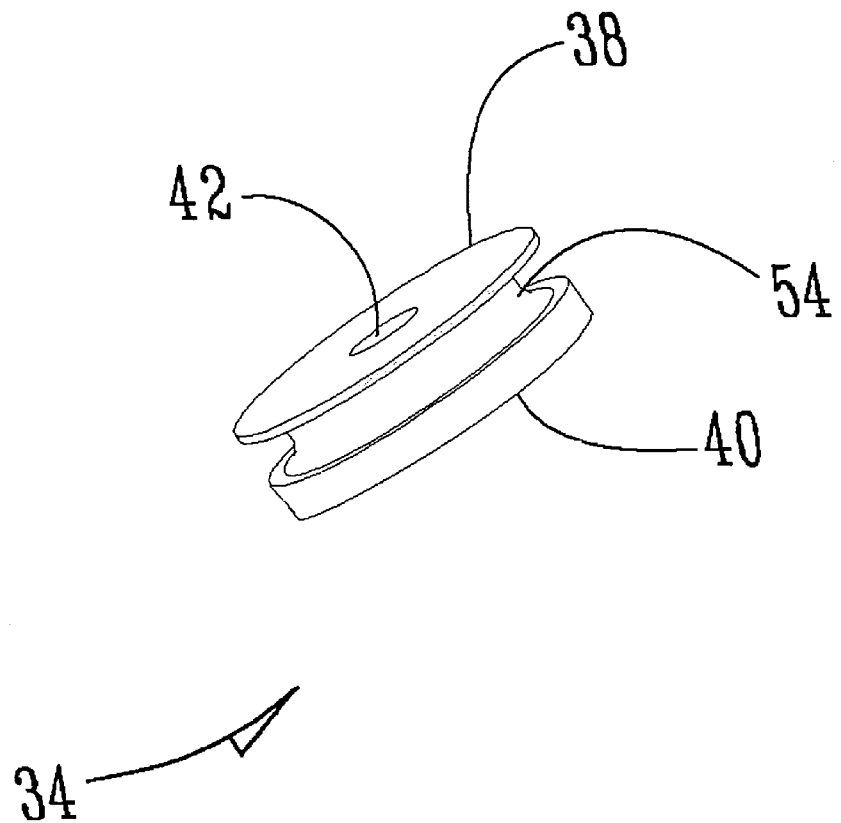
FIG. 3 is a perspective view in elevation of a plunger of the preferred embodiment.

The plunger 34 of the preferred embodiment is shown in greater detail in FIG. 3. The plunger 34 has a first face 38 and a second face 40. The first face 38 faces the clay to be extruded. The second face 40 is substantially thicker than the first face 34, reinforcing the plunger 34 against the clay during extrusion. The plunger 34 of the preferred embodiment defines an aperture 40. The aperture 40 extends through both faces 38 and 40. The plunger aperture 42 of the preferred embodiment is at least as large as the screw first end 30 for placement of the screw first end 30 into the plunger aperture 42.

Figure 4:
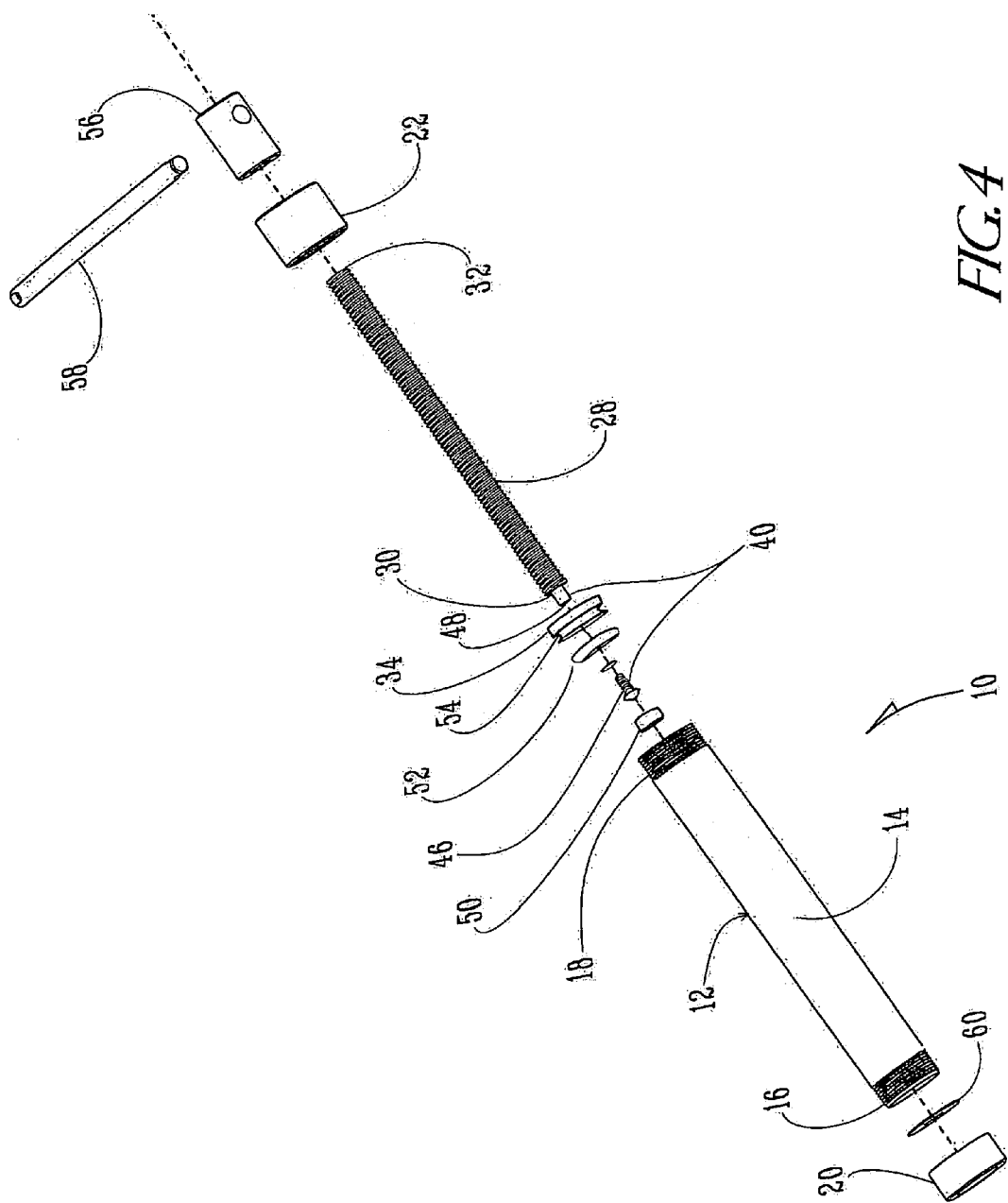
FIG. 4 is a perspective view of the extruder of FIG. 1 disassembled.
Figure 5:
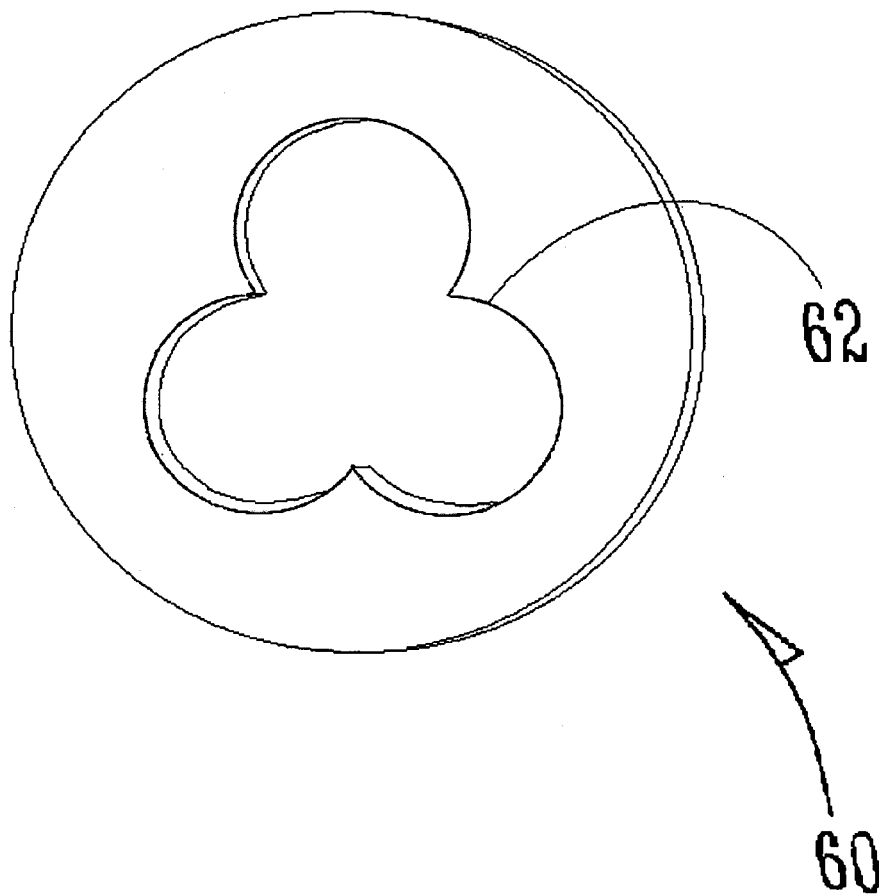
FIG. 5 is a perspective view in elevation of an extrusion disc of the preferred embodiment.

If the plunger 34 were to rotate with the screw 28, then clay engaged by the plunger 34 may become twisted inside the sleeve 12. Therefore, the preferred embodiment includes a swivel means 44 is associated with the screw 28 and the plunger 34. The swivel means 36 allows the plunger 34 to swivel irrespective of rotation of the screw 28. As seen in FIG. 4, a retaining screw 46 inserted into the screw first end 30 serves as the swivel means 44 of the preferred embodiment. To accommodate the retaining screw 46, the screw first end 30 of the preferred embodiment has a threaded bore 48. It should be understood that the swivel means 44 need not be a screw but alternatively could be any commonly known fastener or fastening means that allows the plunger to rotate independently of the screw first end 30. The swivel means 44 thus prevents twisting of the clay.

The preferred embodiment of the plunger 34 also has a cap 50 sized to fit into the plunger aperture 42 and over the swivel means 44 or retaining screw 46. The cap 50 of the preferred embodiment creates a flush surface across the first face 38 of the plunger 34. In the preferred embodiment the cap 50 is friction fit into the plunger aperture 42, but the cap 50 may also be permanently or semipermanently attached by any means commonly known in the art.

Another feature of the preferred embodiment seen in FIG. 4 is an o-ring 52 serving as a sealing means between the first face 38 and the second face 40 of the plunger 34. The o-ring 52 surrounds the plunger 34 and separates the plunger 34 from the sleeve 12. The o-ring 52 inhibits passage of clay between the plunger 34 and the sleeve 12 and in this manner the o-ring 52 prevents leak back of clay. Referring back to FIG. 3, the preferred embodiment of the plunger 34 has a concave surface 54 for receiving the o-ring 52.

As shown in the dissembled extruder displayed in FIG. 4, the handle 36 of the preferred embodiment of the extruder 10 has a head member 56 and a lever 60. The lever 60 is disposed through the head member 56 in a "T" configuration. This configuration accommodates application of greater force on the lever 60 and subsequently higher torque on the screw 28.

Similar to the screw cap 22, the extrusion cap 20 is also removable in the preferred embodiment. An extrusion disk 62 sits between the extrusion cap 20 and the sleeve first end 16. The extrusion disk 62 is perforated with a desired design. An example of a possible desired design 64 is seen in FIG. 4. The desired design 64 can be any shape or pattern capable of being expressed by perforating the extrusion disk 62. Clay pushed through the extrusion disk 62 is forcibly shaped into the desired design 64.

The preferred embodiment of the extruder 10 is made of metal. Only the o-ring 52 is preferably non-metal. Metal construction is rigid and capable of withstanding high torque and pressure. The sleeve body 14 of the preferred embodiment is also textured to aid in grasping and prevention of slippage during manual turning of the screw 28.

Thus, the present invention has been described in an illustrative manner. It is to be understood that the terminology that has been used is intended to be in the nature of words of description rather than of limitation.

Many modifications and variations of the present invention are possible in light of the above teachings. For example, perforation of the extrusion disk 62 other than that seen in FIG. 4 is possible. As another example, the screw 28 may be of different lengths as long as the plunger 34 is capable of engaging the clay. As further examples, the handle 36 may be of different configurations capable of manual grasping and the screw cap 22 and/or the extrusion cap 20 may be permanently attached or even molded onto the sleeve 12. As an ever further example, the second face 40 of the plunger 34 may be any times thicker than the first face 38 to reinforce the plunger 34. Therefore, within the scope of the appended claims, the present invention may be practiced otherwise than as specifically described.

What is claimed is:

1. An apparatus for extrusion of pliable clay material in alternatively selectable design shapes, said apparatus comprising:
   a substantially cylindrical hollow sleeve having a body portion with a first end and a second end;
   an elongated screw having a first end within said sleeve and a second end at least partially outside of said sleeve;
   a reinforced plunger associated with said first end of said screw within said sleeve, said plunger comprising a first face facing away from said screw and a second face opposite said screw, said second face being substantially thicker than said first face;
   sealing means between said plunger first face and plunger second face and encircling the periphery of said plunger and sufficiently sized to be in simultaneous contact with said plunger and the interior of said sleeve;
   a screw cap associated with said second end of said sleeve and having a top with a central aperture through which said second end of said screw extends;
   a handle associated with the second end of said screw;
   extrusion shaping means associated with the terminus of the sleeve first end and being perforated to restrict but still allow the movement of said pliable material through said extrusion means in one of said selectable designs and
   said plunger includes swivel means such that rotation of said screw does not rotate said plunger against said pliable material and an aperture for insertion of said screw first end there through and said swivel means retains said plunger to said screw first end but does not restrict rotation of said plunger with respect to said screw first end;
   said screw first end defines an internally threaded bore and said swivel means is a screw having an external thread to engage said internally threaded bore.

2. The apparatus of claim 1, wherein said extrusion shaping means includes: a retainer cap associated with the terminus of the sleeve first end and having a central opening and a perforated extrusion disk located within the interior of said retainer cap to partially close the opening therein, said disk restricting but still allowing the movement of said pliable material through said retainer cap.

3. The apparatus of claim 1, wherein said handle comprises:
   a head member attached to the second end of said screw; and
   a lever attached to said head member and sufficiently elongated for assisting in manual manipulation to rotate said screw.

4. The apparatus of claim 1 wherein said apparatus includes a means for covering said screw to create a planar surface across said plunger first face and aperture.

5. The apparatus of claim 4 wherein said means for covering said screw is a cap sized to friction fit into said aperture.

6. The apparatus of claim 1 wherein said sealing means is an O-ring.

7. The apparatus of claim 6 wherein said plunger includes a concave surface around its periphery and between said first and second faces to accommodate said O-ring.

8. The apparatus of claim 6 wherein said apparatus with the exception of said O-ring is composed of a substantially rigid material.

9. The apparatus of claim 8 wherein said substantially rigid material is a metal.

10. The apparatus of claim 1 wherein said retainer cap is removably attached to said first end of said sleeve and said extrusion disc is disposed between said retainer cap and said first end of said sleeve.

11. The apparatus of claim 10 wherein said extrusion disc is perforated in a desired design such that extrusion of said pliable material through said disc shapes said pliable material into a desired shape.

12. The apparatus of claim 11 wherein said sleeve is externally textured to enhance gripping of said sleeve during manual rotation of said screw.

13. The apparatus of claim 1 wherein said first and second end of said sleeve are externally threaded and said retainer cap and said screw cap are internally threaded to engage said first and second ends of said sleeve respectively.

14. A reinforced plunger for use with a metal clay extruder having interior walls and a push rod or screw for extruding clay, said plunger comprising:
   a first face;
   a second face, said second face being substantially thicker than said first face;
   sealing means between said plunger first face and plunger second face and encircling the periphery of said plunger and sized to simultaneously contact said plunger and said interior walls of said extruder;
   an aperture extending through said plunger;
   a screw extending through said aperture for retaining said plunger to said push rod or said screw but allowing said plunger to swivel independent of said push rod or said screw.

15. The apparatus of claim 14 wherein said sealing means is an O-ring and said plunger includes a concave surface around its periphery and between said first and second faces to accommodate said O-ring.

16. The apparatus of claim 14 wherein said apparatus includes a means for covering said aperture to create a planar surface across said plunger first face.

17. The apparatus of claim 16 wherein said means for covering said screw is a cap sized to friction fit into said aperture.

* * * * *